United States Patent [19]

Clasen

[11] Patent Number: 4,859,224

[45] Date of Patent: Aug. 22, 1989

[54] METHOD OF MANUFACTURING GLASS OR CERAMIC BODIES

[75] Inventor: Rolf Clasen, Aachen, Fed. Rep. of Germany

[73] Assignee: U.S. Philips Corp., New York, N.Y.

[21] Appl. No.: 229,781

[22] Filed: Aug. 8, 1988

Related U.S. Application Data

[63] Continuation of Ser. No. 15,773, Feb. 17, 1987, abandoned.

[30] Foreign Application Priority Data

Jun. 10, 1986 [NL] Netherlands .......................... 3619510

[51] Int. Cl.$^4$ .......................................... C03B 37/014
[52] U.S. Cl. .......................................... 65/17; 65/3.11;
65/18.2; 65/900; 264/65; 264/66; 264/83
[58] Field of Search ................ 65/3.11, 3.12, 17, 18.2,
65/2, 900; 264/65, 66, 83

[56] References Cited

U.S. PATENT DOCUMENTS

| | | | |
|---|---|---|---|
| 4,157,906 | 6/1979 | Bailey | 65/3.12 |
| 4,338,111 | 7/1982 | Edahiro et al. | 65/18.2 |
| 4,668,263 | 5/1987 | Yokota et al. | 65/3.11 |

FOREIGN PATENT DOCUMENTS

| | | | |
|---|---|---|---|
| 0170249 | 2/1986 | European Pat. Off. | 65/900 |
| 54-103058 | 8/1979 | Japan | 65/900 |
| 56-160334 | 12/1981 | Japan | 65/900 |

*Primary Examiner*—Robert L. Lindsay
*Attorney, Agent, or Firm*—Ernestine C. Bartlett

[57]  ABSTRACT

A method of manufacturing glass or ceramic bodies in which an open-pore green body is formed from the starting material which is subjected to a purification process in a heated purification gas reacting with impurities present in the green body in such a manner that the device in which the green body to be purified is present is rinsed with flowing purification gas, is then sealed and subsequently evacuated until the gases present in the open-pore green bodies in the form of purification gas and gaseous reaction products have been removed, after which the purified green body is sintered, in which metallic impurities in the form of elements of the groups Ib, Va, VIa, VIIa, and/or VIII of the Periodic Table of Elements are converted into volatile complex compounds by a purification gas consisting of a carrier gas saturated with a sulphur-oxygen-halogen compound at a temperature in the range from 200° to 500° C.

15 Claims, No Drawings

METHOD OF MANUFACTURING GLASS OR CERAMIC BODIES

This is a continuation of application Ser. No. 015,773, filed Feb. 17, 1987 abandoned.

FIELD OF THE INVENTION

The invention relates to a method of manufacturing glass or ceramic bodies, in which an open-pore green body is formed from the starting material and is subjected to a purifying process in which a heated purification gas reacts with impurities present in the green body in such a manner that the device in which the green body to be purified is present, is rinsed with flowing purification gas, is then sealed and subsequently evacuated until the gases present in the open-pore green body are removed in the form of purification gas and gaseous reaction products, after which the purified green body is sintered.

The invention further relates to the use of glass bodies manufactured according to the method of the invention.

The method mentioned in the opening paragraph is suitable for purifying porous ceramic green bodies and for purifying green bodies of highly dispersed $SiO_2$ particles which are used as preforms for the manufacture of optical wave guides.

BACKGROUND OF THE INVENTION

Quartz glasses which have substantially no impurities and which in particular are substantially anhydrous are required for the manufacture of optical waveguides as well as for the manufacture of lamp envelopes, in particular for halogen lamps or gas discharge lamps. The manufacture of such glasses via the conventional route of manufacturing from a glass melt is impeded due to impurities which are present.

For this reason, it has been proposed, for the said application purposes, to manufacture highly pure glasses by sintering porous green bodies of very fine quartz glass particles having a particle size in the range from 1 to 500 nm. Since the green bodies are porous and hence gas pervious, they may be subjected to a purification step in a heated gas atmosphere reacting with impurities present and, in the purified condition, they are then sintered to transparent glass at temperatures around 1500° C. Disturbing impurities are, for example, hydroxyl ions and ions and particles of the transition metals.

Such green bodies may be formed from suspensions via a sol-gel conversion but also porous green bodies of pulverised starting materials may be formed, for example, by centrifuging followed by form stabilisation. A method of manufacturing glass bodies which are to be used as preforms for the manufacture of optical waveguides in which open-pore green bodies are purified with a chlorine-containing purification gas heated at a temperature in the range from 600° to 900° C. is known from German Patent Application P 35 11 439.8. This method has proved suitable in particular for removing hydroxyl ions. The essential idea of said purification process is that impurities present diffuse to the surface of the very small quartz glass particles by means of solid state diffusion, react there with the chlorine-containing atmosphere to form volatile compounds and are forced by periodic pressure gradients, through the open pores to the surface of the preform.

A problem in this method is that impurities which are present from the beginning at the surface of the highly dispersed quartz glass particles do not immediately react completely to be transported away but have sufficient time to also diffuse into the material due to the high temperatures of the purification process. This may impede a purification process essentially.

Examples of the said impurities are ions and particles of copper, vanadium, chromium, molybdenum, tungsten, manganese, iron, cobalt or nickel which result from the mechanical abrasion during mixing and extrusion of the starting material to manufacture a green body and have deposited on the surface of the powder particles taking part in the composition of the starting mass.

SUMMARY OF THE INVENTION

An object of the invention is to improve the method described in the opening paragraph in such a manner that diffusion of impurities into the green body to be purified is substantially avoided in the purification process.

According to the invention, this object is achieved in that metallic impurities in the form of elements of the groups Ib, Va, VIa, VIIa and/or VIII of the Periodic Table of Elements (PTE) are transformed into volatile complex compounds at a temperature in the range from 200° to 500° C. by means of a purification gas consisting of a carrier gas saturated with a sulphur-oxygen-halogen compound.

The invention is based on the recognition of the fact that a diffusion of impurities into the green body to be purified can substantially be avoided when the purification process can be carried out at comparatively low temperatures.

A concomitant condition for this purification at comparatively low temperatures is that volatile compounds of the impurities to be removed have to be formed at comparatively low temperatures.

DETAILED DESCRIPTION OF THE PREFERRED EMBODIMENTS

In transport measurements of $Fe_2O_3$ in thionyl chloride ($SOCl_2$) at different temperatures it has surprisingly been found that very volatile oxygen-sulphur-chlorine-complex compounds are formed in the temperature range between 300° and 400° C. Other elements such as, for example, copper, vanadium, chromium, molybdenum, tungsten, magnanese, cobalt or nickel behave in the same manner. It is hence possible to reactively volatilize such impurities in a purification gas consisting of a carrier gas (for example, oxygen when oxidic starting materials are used) and a sulphur-oxygen-halogen compound (for example thionyl chloride or sulphuryl chloride) with which the carrier gas is saturated, in the temperature range from 250° to 500° C., preferably in the temperature range from 350° to 450° C.

According to one embodiment of the method in accordance with the invention, the purification cycle with the steps of rinsing the device with a purification gas and evacuating the device until the gases present in the green body are removed, is repeated until a sufficiently small impurity concentration has been reached over the whole cross-section of the green body thus the purification process with small pore diameters of the green body can be accelerated.

Of course it is also possible by means of the present method to clean not only preformed open-pore green bodies but the powdered starting material as well.

In the cases in which an open-pore component is subsequently manufactured from said powdered starting material it is, however, more effective to perform the purification step only immediately before the final contacting of the component, for example by sintering, so as to eliminate impurities in one step.

According to another embodiment of the method in accordance with the invention, a quantity of purification gas for one purification cycle is applied which is larger than the pore volume of the green body to be purified. As a result of this it is ensured that the whole pore volume of the open-pore green body can be filled with purification gas in each cycle.

According to another embodiment of the method in accordance with the invention, cycles are used in a ratio of duration of rinsing: duration of evacuation in the range from 1:1 to 20:1, preferably with a ratio of 5:1, with a duration of rinsing of 5 minutes and an evacuation duration of 1 minute.

With a duration of only one hour, such a highly pure green body is obtained that a glass body subsequently sintered from such a green body has a concentration of metallic impurities of <1 ppm over its total cross-section.

The advantages which can be achieved by means of the invention consist inter alia in that after a purification process of comparatively short duration, high-purity green bodies can be obtained in a reproducible manner for the manufacture of quartz glass bodies even when highly densified porous green bodies have to be purified.

The capability of performing the purification process at comparatively low temperatures presents the further advantage that the in-diffusion of impurities into the green body or in the powdered starting material is avoided.

A further great advantage for a large scale manufacture, that is a manufacture not under laboratory conditions, is that machines (mixers, kneaders, extruders) of non-coated (uncovered) noble steels may be used.

The invention will be described with reference to a specific example.

A green body was manufactured in a mould by centrifuging $SiO_2$ particles of a particle diameter in the range from 10 to 100 nm with a preponderant part of the particles of a particle diameter of 40 nm. For that purpose, 200 g of highly dispersed $SiO_2$ powder in 300 cm$^3$ aqueous 0.5% ammonia solution was stirred and dispersed for 10 minutes under ultrasound influence at a frequency of f=35 kHz. Such a suspension was centrifuged in a large laboratory centrifuge for 15 minutes at 10 000 g, the clear solution was drained off and the sedimented bodies were heated in a period of 25 hours to 120° C. and dried at this temperature for 1 hour. In this manner, tubular green bodies were manufactured having a density of 45% of the density of quartz glass with an inside diameter of 8 mm, an outside diameter of 16 mm and a length of 500 mm. Such green bodies showed impurities in particular of iron of 50 ppm.

These green bodies were purified in a furnace at a temperature of 420° C. for 2 hours, in which an $O_2$ gas flow of $10^{-3}$ m$^3$/min (relating to normal conditions) saturated with thionyl chloride at a temperature of 20° C. was rinsed through the furnace for 5 minutes and the furnace was then evacuated for 1 minute after said filling with purification gas; so a ratio of filling duration to evacuation duration of 5:1 is obtained. This cycle was repeated over a duration of 1 hour. The green body purified under these conditions was then sintered at a temperature of 500° C. in a helium atmosphere with 2% by volume of chlorine gas addition, the green body being passed through the furnace at a lowering rate of 3 mm per minute. A transparent, bubble-free and fog-free glass tube having a diameter of 12.25 mm was obtained with metallic impurities over the whole cross-section of <1 ppm. The resulting quartz glass body had a density of 2.2 g/cm$^3$ and a refractive index $n_D$=1.4590.

The manufacture of highly pure quartz glass tubes has been described as a specific example of the invention. However, the present method may be used for any technology in which highly pure formed bodies are to be manufactured from powdered oxidic starting materials. For example, the manufacture of highly pure formed bodies of aluminium oxide $Al_2O_3$ or also the manufacture of electronic components of ceramic, for example, capacitors are such technologies wherein the present method may be employed.

In all the said methods it is an important advantage, in particular for the manufacture on a larger scale, that by means of the present method the extra coating (for example, by providing $Al_2O_3$ by means of cathode sputtering on the surfaces of the tools) of the tools (kneaders, mixers, extruders) for preventing metallic abrasion of the masses to be worked by means of the devices, may be omitted. Since ceramic masses exert a certain grinding effect on the tool surfaces, such expensive coatings must as a rule be repeated after a few passages.

The following Table explains how superficially deposited metallic impurities can be removed by means of the present method from an extrudate mass consisting of 60% by weight of $SiO_2$, 5% by weight of a water-soluble binder and 35% by weight of $H_2O$. The measurements were carried out by means of a neutron activation analysis.

| | Extrudate mass | |
|---|---|---|
| Type of impurity | Impurities prior to purification [ppb] | Impurities after purification [ppb] |
| Cu | 300 | 48 |
| Cr | 12000 | 93 |
| Mo | 1700 | 17 |
| W | 15 | 0.7 |
| Fe | 54000 | 890 |
| Co | 19 | 3.6 |
| Ni | 1500 | 21 |

What is claimed is:

1. A method of manufacturing glass or ceramic bodies, in which an open-pore green body is formed from the starting material and is subjected to a purification process in which a heated purification gas is reacted with impurities present in the green body, in such a manner that the green body to be purified, is rinsed with flowing purification gas, is then sealed and subsequently evacuated until the gases present in the open-pore green body are removed in the form of purification gas and gaseous reaction products, after which the purified green body is sintered, wherein metallic impurities in the form of elements of the groups Ib, Va, VIa, VIIa and/or VIII of the Periodic Table of Elements are converted into volatile complex compounds at a temperature in the range from 200° to 500° C. by means of a purification gas consisting of a carrier gas saturated with a sulphur-oxygen-halogen compound.

2. A method as claimed in claim 1, wherein oxygen is used as said carrier gas for the purification of said green bodies.

3. A method as claimed in claim 1, wherein said metallic impurities in the form of copper, vanadium, chromium, molybdenum, tungsten, manganese, iron, cobalt or nickel are reactively volatilized.

4. A method as claimed in claim 3, wherein thionyl chloride is used as said sulphur-oxygen-halogen compound.

5. A method as claimed in claim 3, wherein sulphuryl chloride is used as said sulphur-oxygen-halogen compound.

6. A method as claimed in claim 1 wherein a gas mixture of $O_2$ with an addition of 5 to 10% by volume of the sulphur-oxygen-halogen compound is used as said purification gas.

7. A method as claimed in claim 1 wherein the purification cycle with the steps of rinsing with purification gas and evacuating until the gases present in the green body has been removed is repeated until a sufficiently small impurity concentration over the whole cross-section of the green body has been reached.

8. A method as claimed in claim 7, wherein cycles in a ratio of rinsing duration: evacuation duration in the range from 1:1 to 20:1 are used.

9. A method as claimed in claim 8, wherein a ratio of 5:1 with a rinsing duration of 5 minutes and an evacuation duration of 1 minute is used.

10. A method as claimed in claim 1, wherein the impurities in the green body are converted into volatile compounds at a temperature in the range from 350° to 450° C.

11. A method as claimed in claim 1, wherein a quantity of purification gas which is larger than the pore volume of the green body to be purified is used for a purification cycle.

12. A method as claimed in claim 6 wherein a gas mixture of $O_2$ saturated with thionyl chloride at a temperature of 20° C. is used as said purification gas and in that the purification process is carried out at a temperature of 420° C.

13. A method of manufacturing glass or ceramic bodies, in which an open-pore green body is formed from a starting material and which is subjected to a purification process in which (a) a heated purification gas is reacted with impurities present in the green body; (b) said green body is rinsed with said purification gas, sealed and subsequently evacuated until the gases present in the green body are removed; and (c) the purified green body is sintered;

wherein the green body is purified at a temperature of about 200° to 500° C. with a purification gas comprising a carrier gas containing a sulphur-oxygen-halogen compound whereby metallic impurities are converted into complex volatile compounds and removed from the green body during said evacuation steps.

14. A method as claimed in claim 13 in which the purification gas is selected from the group consisting of (1) oxygen saturated with thionyl chloride; (2) oxygen containing 5 to 10% by volume of sulphuryl chloride.

15. A method as claimed in claim 10 wherein a gas mixture of $O_2$ saturated with thionyl chloride at a temperature of 20° C. is used as said purification gas and in that the purification process is carried out at a temperature of 420° C.

* * * * *